United States Patent
Pavani

(10) Patent No.: US 11,938,640 B2
(45) Date of Patent: Mar. 26, 2024

(54) DISH PERCEPTION, PLANNING AND CONTROL FOR ROBOTS

(71) Applicant: Sri Rama Prasanna Pavani, San Carlos, CA (US)

(72) Inventor: Sri Rama Prasanna Pavani, San Carlos, CA (US)

(73) Assignee: Dishcare Inc., San Carlos, CA (US)

(*) Notice: Subject to any disclaimer, the term of this patent is extended or adjusted under 35 U.S.C. 154(b) by 574 days.

(21) Appl. No.: 17/202,266

(22) Filed: Mar. 15, 2021

(65) Prior Publication Data

US 2022/0288789 A1    Sep. 15, 2022

(51) Int. Cl.
| | |
|---|---|
| *B25J 9/16* | (2006.01) |
| *A47B 81/04* | (2006.01) |
| *B25J 11/00* | (2006.01) |
| *G06F 18/24* | (2023.01) |
| *G06T 7/73* | (2017.01) |
| *G06V 20/68* | (2022.01) |
| *H04N 7/18* | (2006.01) |
| *H04N 23/56* | (2023.01) |

(52) U.S. Cl.
CPC .......... *B25J 9/1697* (2013.01); *A47B 81/04* (2013.01); *B25J 9/1664* (2013.01); *B25J 11/0045* (2013.01); *G06F 18/24* (2023.01); *G06T 7/73* (2017.01); *H04N 7/188* (2013.01); *H04N 23/56* (2023.01); *A47B 2220/0077* (2013.01); *G06T 2207/10048* (2013.01); *G06V 20/68* (2022.01)

(58) Field of Classification Search
CPC ............................. B25J 9/1697; B25J 11/0085
See application file for complete search history.

(56) References Cited

U.S. PATENT DOCUMENTS

| | | | |
|---|---|---|---|
| 7,269,479 B2 | 9/2007 | Okamoto et al. | |
| 2007/0124024 A1* | 5/2007 | Okamoto | B25J 9/0003 700/245 |
| 2015/0003678 A1* | 1/2015 | Watanabe | B25J 9/1697 382/103 |
| 2018/0036889 A1* | 2/2018 | Birkmeyer | B25J 15/0608 |
| 2020/0311956 A1* | 10/2020 | Choi | G06V 10/454 |
| 2021/0076898 A1* | 3/2021 | Smith | A47L 15/0028 |
| 2021/0138655 A1* | 5/2021 | Mousavian | B25J 9/161 |

FOREIGN PATENT DOCUMENTS

CN    108354564 A    8/2018

* cited by examiner

*Primary Examiner* — Timothy R Waggoner

(57) ABSTRACT

A system and method for perceiving a dish, planning its handling, and controlling its motion, comprising: capturing at least one image of a region disposed to comprise said dish using at least one camera; classifying said image using a dish detection model to determine the presence of a dish; classifying said image using a dish identification model to determine the type of said dish; estimating the position and orientation of said dish using a dish localization model; picking up, holding, or dropping off said dish securely using said type, position, and orientation of said dish with a robotic arm, whereby said dish is detected, identified, and localized to securely move it from one location to another.

16 Claims, 17 Drawing Sheets

DISH PERCEPTION, PLANNING AND CONTROL FOR ROBOTS

FIELD OF THE INVENTION

This invention relates generally to perceiving a dish, planning its handling, and controlling its motion to enable a robot to securely move the dish from one location to another.

BACKGROUND

People pick up, hold, move, and drop-off dishes such as plates and bowls with ease. We are able to handle dishes without difficulty even when dishes are located together with a number of other dishes. For most of us, handling such dishes when they are located inside a kitchen cabinet or a sink isn't much of a hassle either. This is because human vision is gifted with a sophisticated perception capability that has learned to estimate the three-dimensional positions and orientation of the things we see. The combination of our perception capability together with our planning and control capabilities yields us the ability to easily grip dishes and move them from one location to another securely.

Without a perception capability comparable to what people have, robots find it very difficult to handle dishes. The difficulty aggravates when different types of dishes (such as plates, bowls, mugs, cups, forks, spoons, etc.) are involved. Adding to the difficulty, dishes are often found in different positions and orientations together with a diverse group of other dish types. In order to be able to pick up, hold, or drop-off a dish in such a complex environment, a robot would need a robust perception, planning, and control capability to detect the presence of a dish; to identify the type of the dish; to localize the position and orientation of the dish; and use the above information to determine how to securely pick up, hold, move, and drop-off the dish with an end effector (such as a gripper or a vacuum suction cup).

Conventional robots do not have such a sophisticated perception, planning, and control capabilities described above for handling dishes. Such conventional robots are typically best suited for moving an independent object of a single type in an otherwise open and unobstructed environment.

Accordingly, there is a need for an improved system and method to perceive dishes, plan the handling of dishes, and control the motion of a robot to securely move dishes. One that could detect the presence of a dish; one that could identify the type of a dish; and one that could localize the position and orientation of the dish; one that could perceive the dish when it is collocated together with a diverse group of other dishes; and one that could securely pick up, hold, move, and drop-off such a collocated dish.

SUMMARY

The invention is a system and method for dish perception, planning, and control to enable robots to securely pick up, hold, move, and drop-off dishes, even when they are collocated together with a diverse group of other dishes.

In some embodiments, the invention is a system for perceiving a dish, planning its handling, and controlling its motion, comprising: at least one camera for capturing at least one image of a region disposed to comprise said dish; a processor configured to: classify said image using a dish detection model to determine the presence of a dish; classify said image using a dish identification model to determine the type of said dish; estimate the position and orientation of said dish using a dish localization model; and a robotic arm to securely pick up, hold, or drop-off said dish using said type, position, and orientation of said dish, whereby said dish is detected, identified, and localized to securely move it from one location to another.

In some embodiments, the invention is a method for perceiving a dish, planning its handling, and controlling its motion, comprising: capturing at least one image of a region disposed to comprise said dish using at least one camera; classifying said image using a dish detection model to determine the presence of a dish; classifying said image using a dish identification model to determine the type of said dish; estimating the position and orientation of said dish using a dish localization model; picking up, holding, or dropping off said dish securely using said type, position, and orientation of said dish with a robotic arm, whereby said dish is detected, identified, and localized to securely move it from one location to another.

DETAILED DESCRIPTION OF THE PREFERRED EMBODIMENTS

Figure 1:
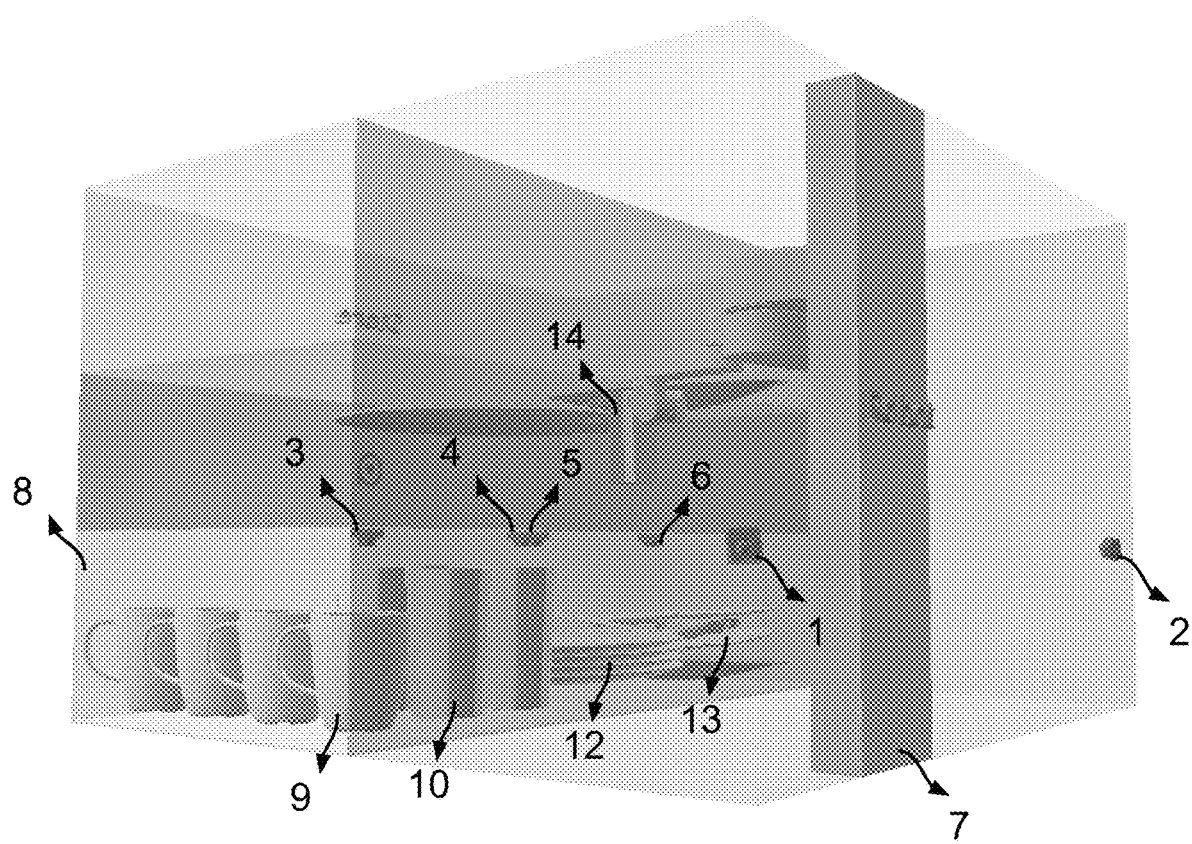
FIG. 1 shows a three-dimensional view of a system for perceiving a dish, planning its handling, and controlling its motion, in accordance with the invention.

FIG. 1 shows a three-dimensional view of a system for perceiving a dish, planning its handling, and controlling its motion, in accordance with the invention.

A dish is an article that makes contact with a food or a drink while preparing, serving, consuming, or storing of the food or the drink. A number of dishes such as mugs 9, cups 10, bowls 11, plates 12, and flatware 13 are located in a cabinet 8. Flatware include forks, spoons, knives and chopsticks. Dishes also include pots, pans and other kitchen utensils used for preparing, serving or storing food.

At least one camera is mounted to capture at least one image of the dishes in cabinet 8. Cameras 1 and 2 are mounted outside cabinet 8. Cameras 3, 4, 5, and 6 are mounted inside cabinet 8. Each camera captures a different view of the dishes in cabinet 8 based on camera position, orientation, field of view, and other imaging parameters such as wavelength filters, numerical aperture, and sensor pixel size. In some embodiments, cameras are mounted outside a cabinet such that at least one dish is visible in the images acquired by cameras through a substantially transparent window or an opening of the cabinet. In some embodiments, each camera captures a unique view of one or more dishes. In some embodiments, at least one camera captures an image at a different wavelength than at least one other camera.

In some embodiments, dishes are not located inside a cabinet. For example, they may be located on a table, kitchen counter or on a kitchen sink. In such embodiments, the cameras are mounted at a location from which unobstructed views of the dishes can be captured.

In some embodiments, a light source illuminates a region disposed to comprise one or more dishes. In some embodiments, a light source is either configured as a ring that surrounds a camera or configured as a diffuse illumination panel. In some embodiments, light source emits a structured pattern of light such as dots or lines. In some embodiments, the structured light source comprises a diffractive optical element or a computer generated hologram to produce the structured light pattern. In some embodiments, the light source comprises a laser. In some embodiments, a light source emits infrared light. In some embodiments, a camera is designed to capture infrared images. In some embodiments, a camera captures images at periodic intervals of time. In some embodiments, a camera captures images when a dish is placed, removed, or relocated in a region disposed to comprise one or more dishes.

One or more images captured by at least one camera is processed with a dish detection model to determine if one or more dishes are present in the images. The dish detection model is an image classifier which takes an image as input and determines the presence or absence of the following classes of objects: dishes, food waste, unknown object. In some embodiments, the dish detection model is a neural network that is trained with deep learning techniques. In some embodiments, labeled data sets of images of dishes, food waste, and unknown objects are used to train the neural network. Once trained, the dish detection model is ready to be used for inference, where it processes the input image and provides probabilities or confidence metrics for the image to contain one or more dishes, food waste, or unknown objects.

A region of an image classified to contain a dish is then processed with a dish identification model to determine the type of the dish. The dish identification model is an image classifier which takes an image region as input and determines the type of a dish. In some embodiments, the dish identification model classifies image data into one or more of the following classes: plate, bowl, cup, mug, spoon, fork, knife, chopstick. In some embodiments, the dish identification model is a neural network that is trained with deep learning techniques. In some embodiments, labeled data sets of images containing different dish types are used to train the neural network. Once trained, the dish identification model is ready to be used for inference, where it processes the input image and provides probabilities or confidence metrics for the image to comprise different dish types. For example, an image region comprising a plate, when processed with a dish identification model, earns a high probability or confidence score for comprising a plate and a low probability or confidence scope for comprising a fork.

A region of an image classified to contain a dish is then processed with a dish localization model to estimate the positions of one or more dishes. The dish localization model is an object localization model or object detector model which takes one or more image regions as inputs and estimates the three dimensional positions of a plurality of points of a dish. In some embodiments, the dish localization model also estimates the three dimensional orientation of the dish. The three dimensional orientation of the dish represents the rotational angle of the dish about the three cartesian (X, Y and Z) axes. In some embodiments, the dish localization model is a neural network that is trained with deep learning techniques. In some embodiments, labeled data sets of images containing dishes at different positions are used to train the neural network. In some embodiments, labeled data sets of images containing dishes at different orientations are used to train the neural network. Once trained, the dish localization model is ready to be used for inference, where it processes the input image and estimates the location of one or more points on the dish. In some embodiments, the type, position, and orientation of a plurality of dishes are estimated from one or more images. In some embodiments, a depth map is obtained by using stereo triangulation of two or more camera images. In other embodiments, a structured illumination projector projects a known light pattern (dots, stripes, etc.) on to the dishes. The pattern deforms according to the three dimensional structure of the dishes. This deformation of the pattern can then be used to determine a depth map. In some embodiments, the dish localization model computes a depth map. In other embodiments, the dish localization model uses a depth map as an input to estimate the three dimensional positions of one or more points on a dish.

Once a dish and its neighboring dishes are localized, a planning model plans how a robotic arm 7 could securely pick up, hold, move or drop-off said dish using said type, position, and orientation of the dish and its neighboring dishes. This involves a series of steps. First, the planning model determines where the end effector 14 of the robotic arm 7 should grip the dish in order to be able to securely hold the dish. In some embodiments, robotic arm 7 positions and orients the end effector 14 based on the type, position, and orientation of the dish. Second, the planning model determines a secure trajectory of motion for end effector 14. The secure trajectory avoids potential collisions with other objects around the dish. Third, the planning model determines how to gently drop-off the dish without causing any damage to the dish or its neighboring dishes.

Figure 2:
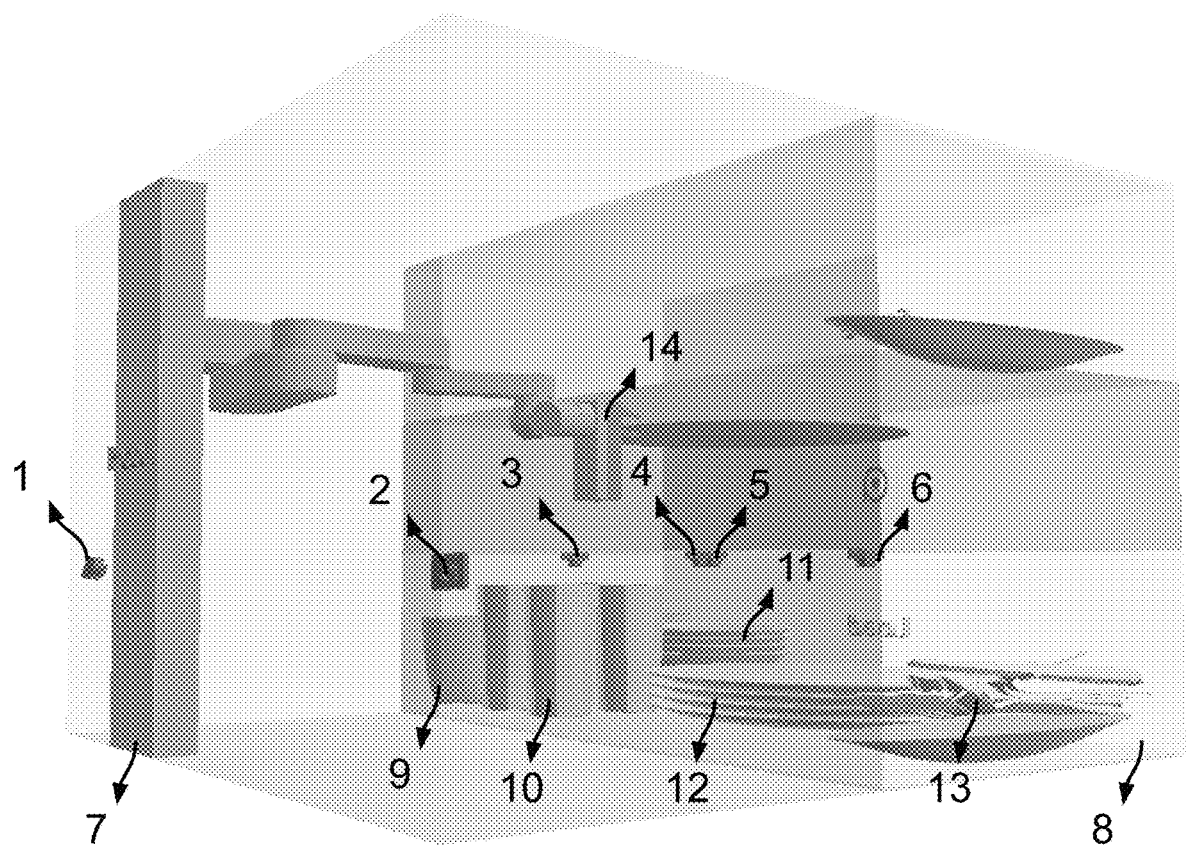
FIG. 2 shows another three-dimensional view of a system for perceiving a dish, planning its handling, and controlling its motion, in accordance with the invention.

In some embodiments, the end effector comprises 14 at least two movable fingers or a vacuum suction cup to grip said dish FIG. 2 shows another three-dimensional view of a system for perceiving a dish, planning its handling, and controlling its motion, in accordance with the invention.

Figure 3:
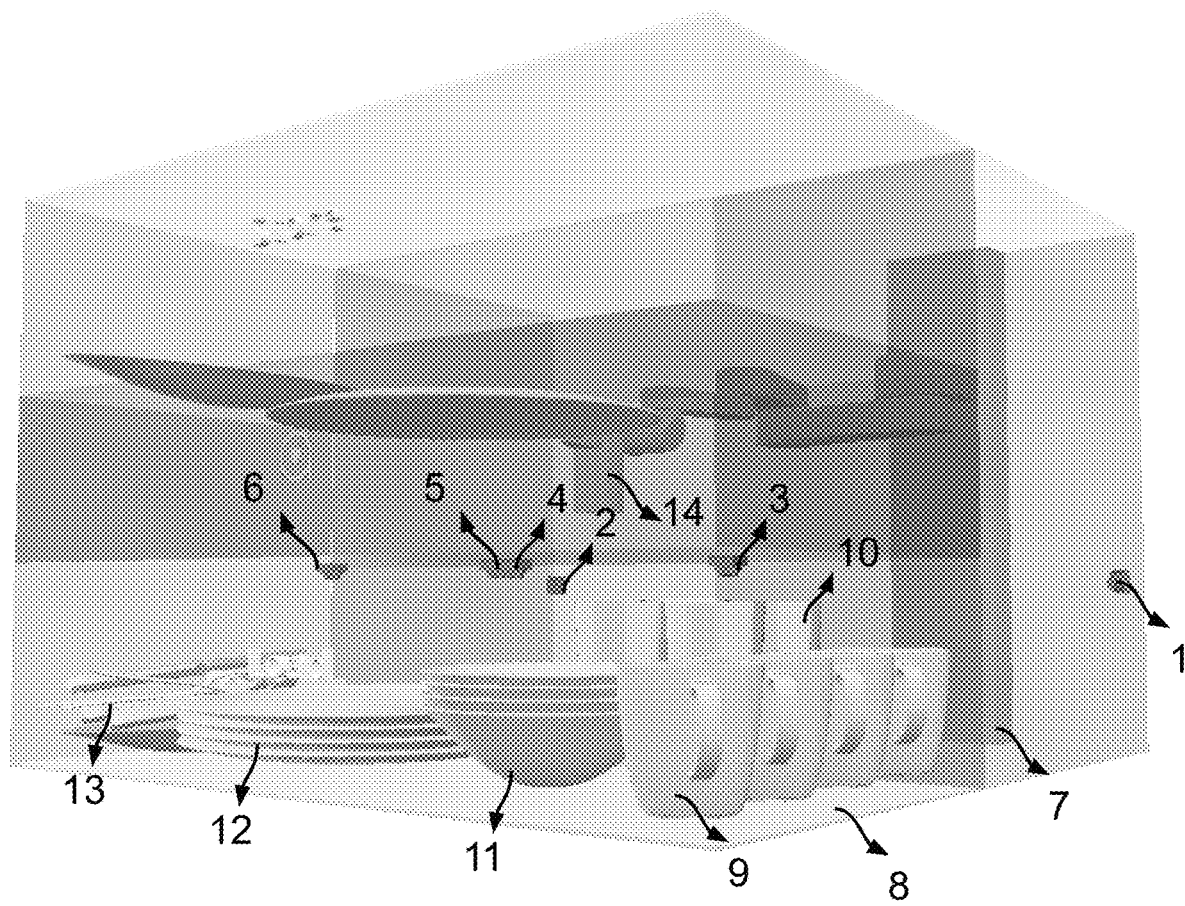
FIG. 3 shows yet another three-dimensional view of a system for perceiving a dish, planning its handling, and controlling its motion, in accordance with the invention.

FIG. 3 shows yet another three-dimensional view of a system for perceiving a dish, planning its handling, and controlling its motion, in accordance with the invention.

Figure 4:
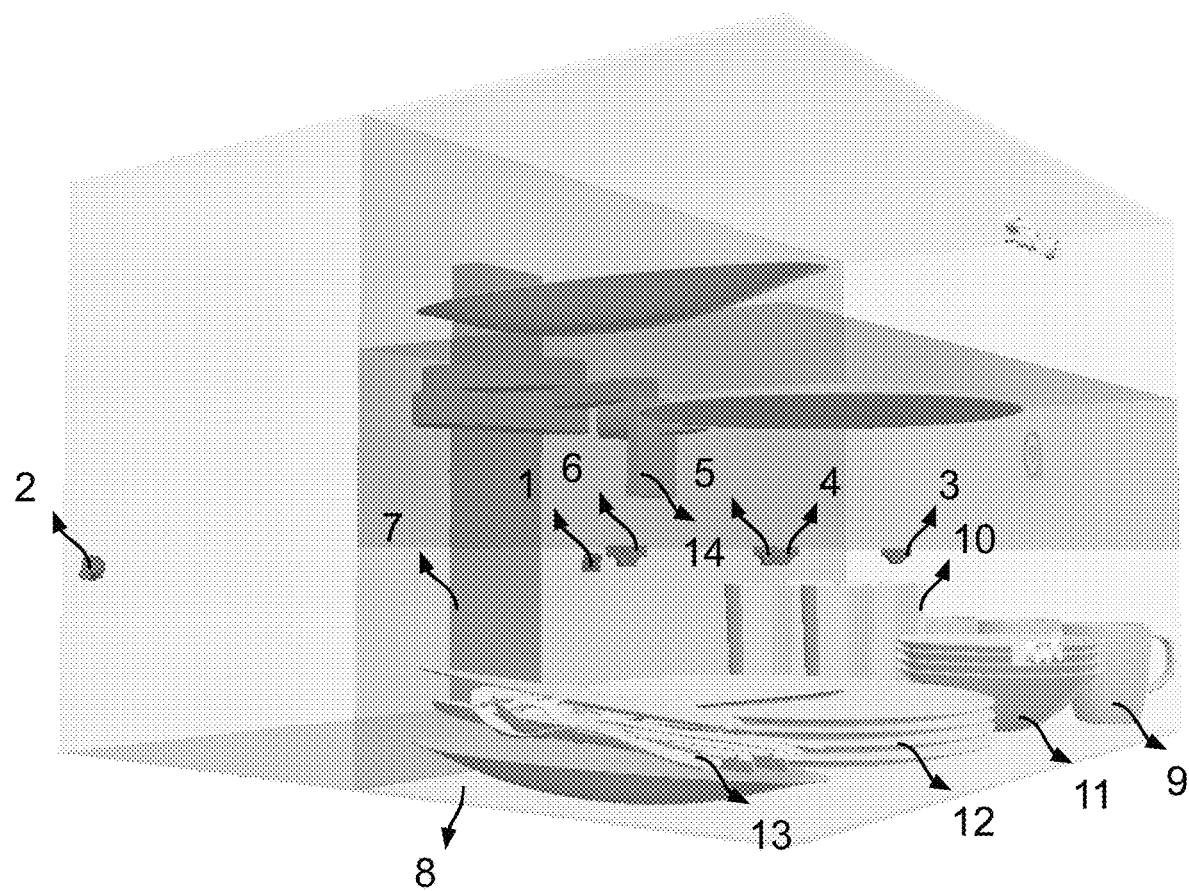
FIG. 4 shows one more three-dimensional view of a system for perceiving a dish, planning its handling, and controlling its motion, in accordance with the invention.

FIG. 4 shows one more three-dimensional view of a system for perceiving a dish, planning its handling, and controlling its motion, in accordance with the invention.

Figure 5:
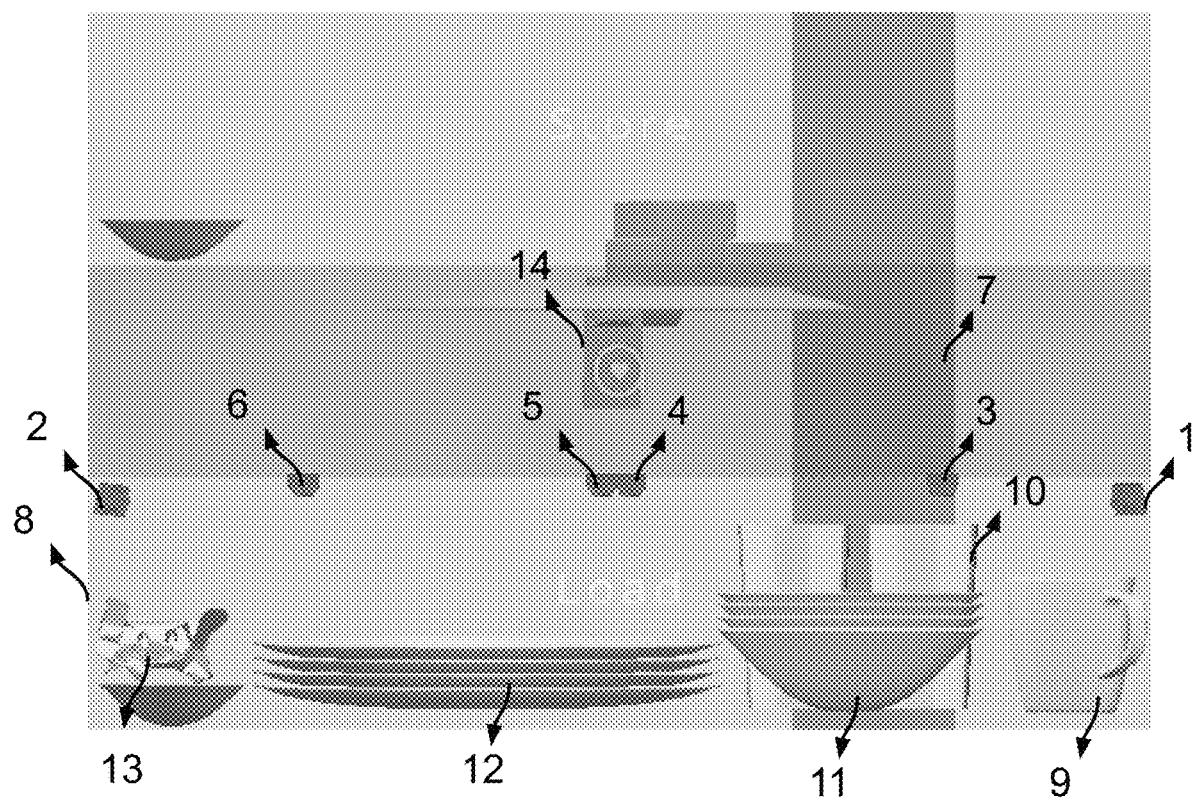
FIG. 5 shows a front view of a system for perceiving a dish, planning its handling, and controlling its motion, in accordance with the invention.

FIG. 5 shows a front view of a system for perceiving a dish, planning its handling, and controlling its motion, in accordance with the invention.

Figure 6:
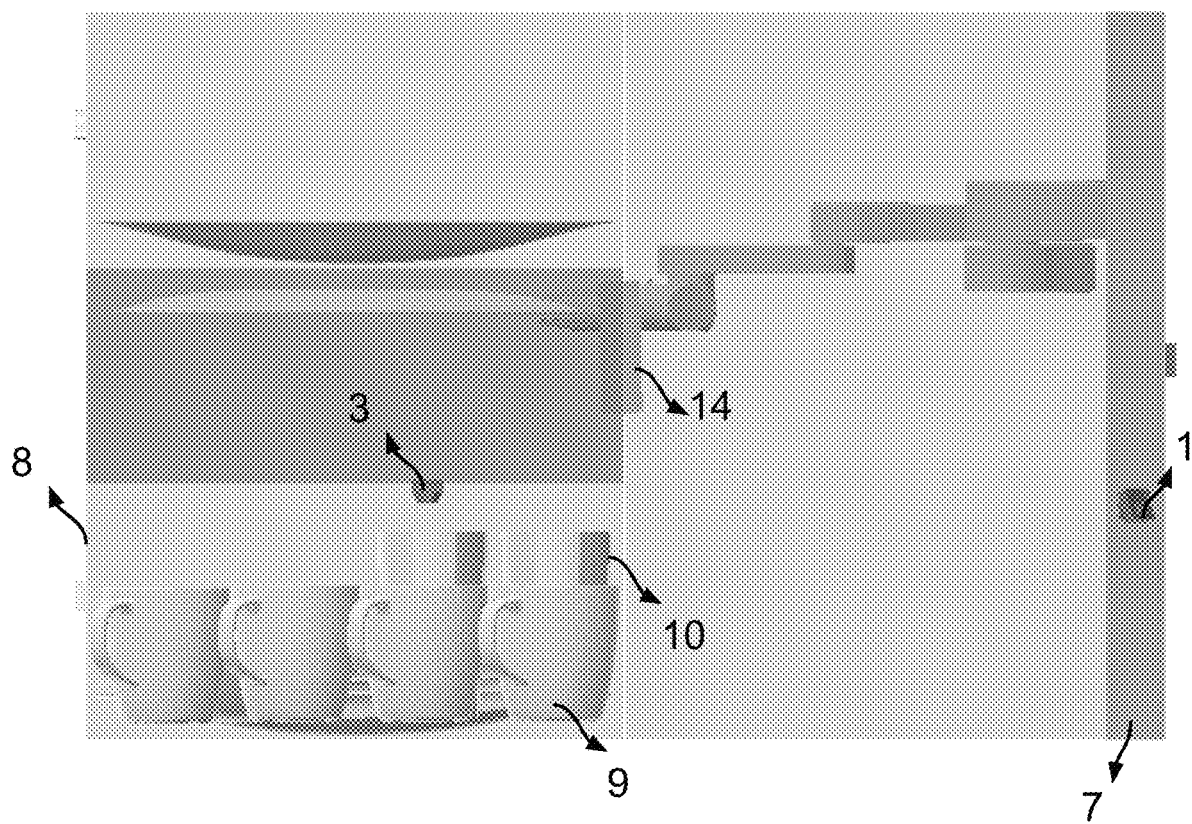
FIG. 6 shows a right-side view of a system for perceiving a dish, planning its handling, and controlling its motion, in accordance with the invention.

FIG. 6 shows a right-side view of a system for perceiving a dish, planning its handling, and controlling its motion, in accordance with the invention.

Figure 7:
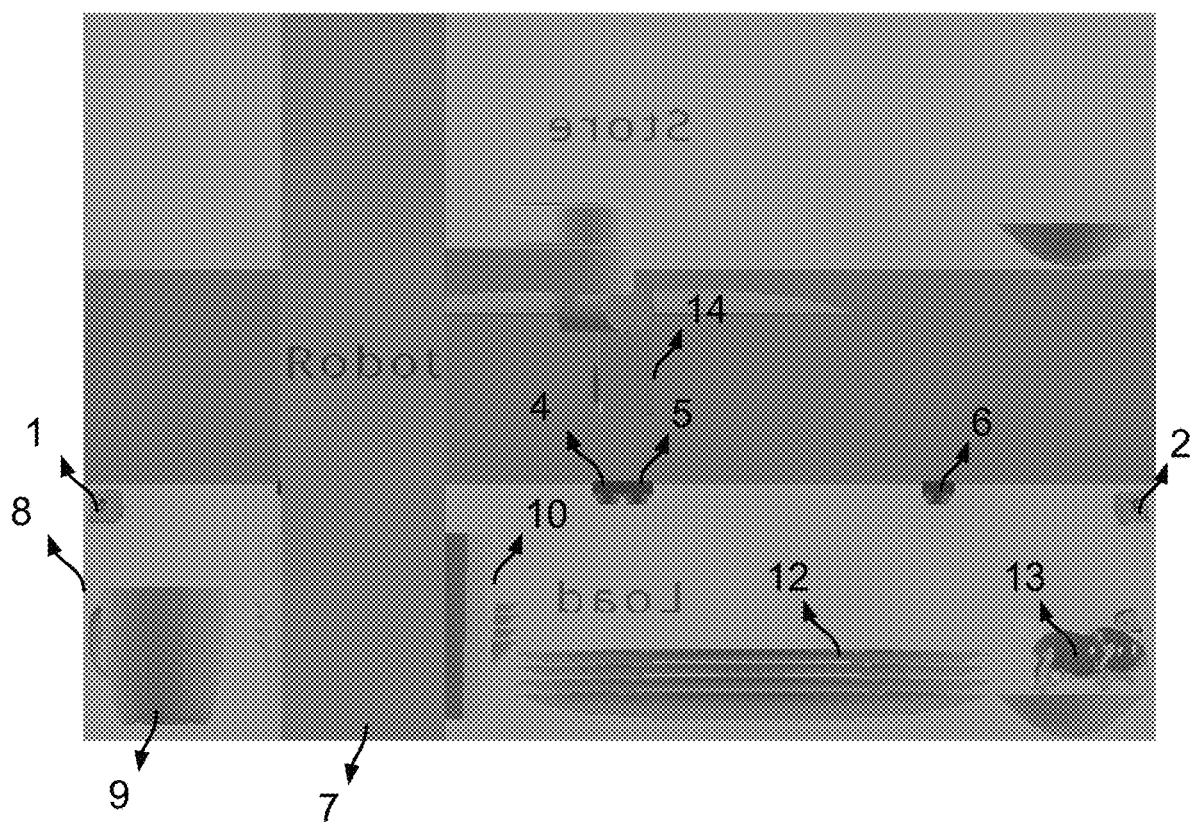
FIG. 7 shows a back view of a system for perceiving a dish, planning its handling, and controlling its motion, in accordance with the invention.

FIG. 7 shows a back view of a system for perceiving a dish, planning its handling, and controlling its motion, in accordance with the invention.

Figure 8:
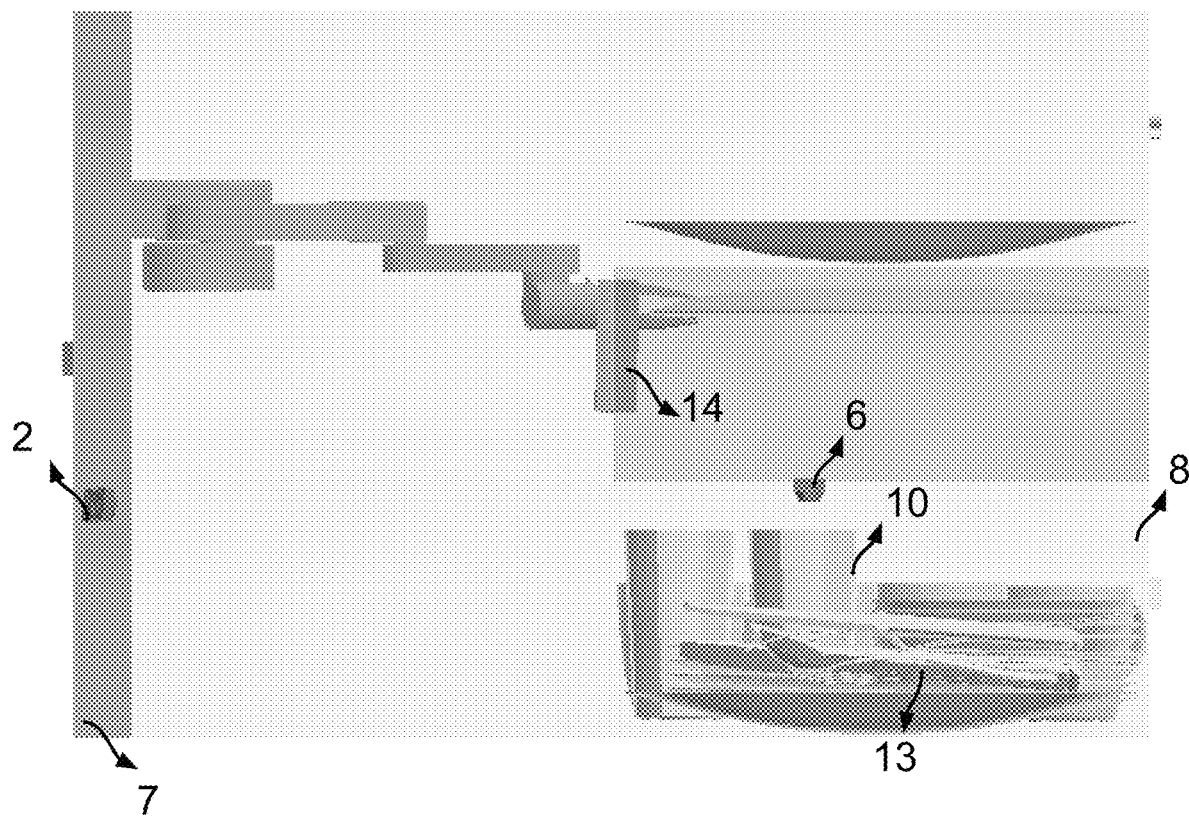
FIG. 8 shows a left-side view of a system for perceiving a dish, planning its handling, and controlling its motion, in accordance with the invention.

FIG. 8 shows a left-side view of a system for perceiving a dish, planning its handling, and controlling its motion, in accordance with the invention.

Figure 9:
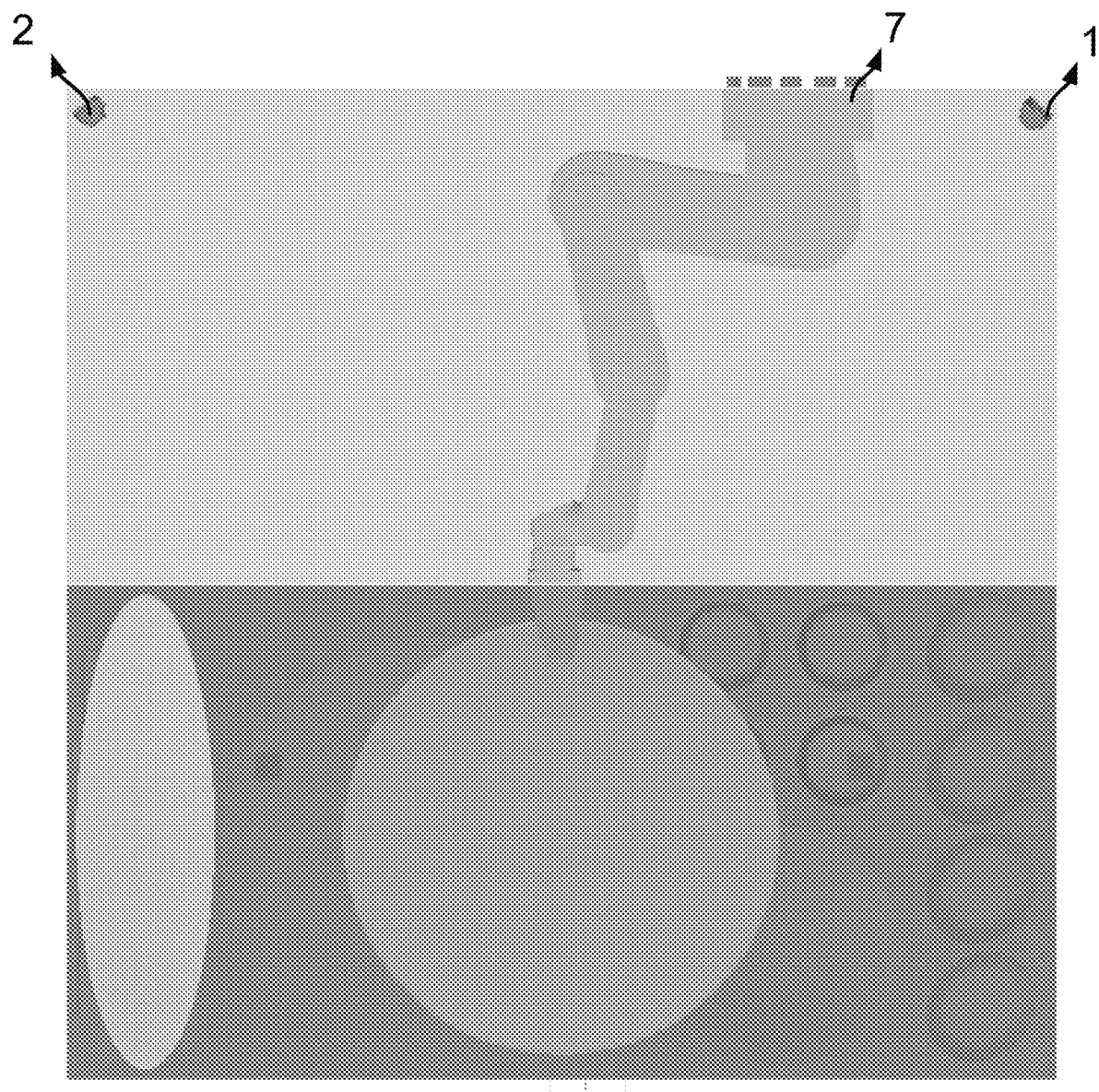
FIG. 9 shows a top view of a system for perceiving a dish, planning its handling, and controlling its motion, in accordance with the invention.

FIG. 9 shows a top view of a system for perceiving a dish, planning its handling, and controlling its motion, in accordance with the invention.

Figure 10:
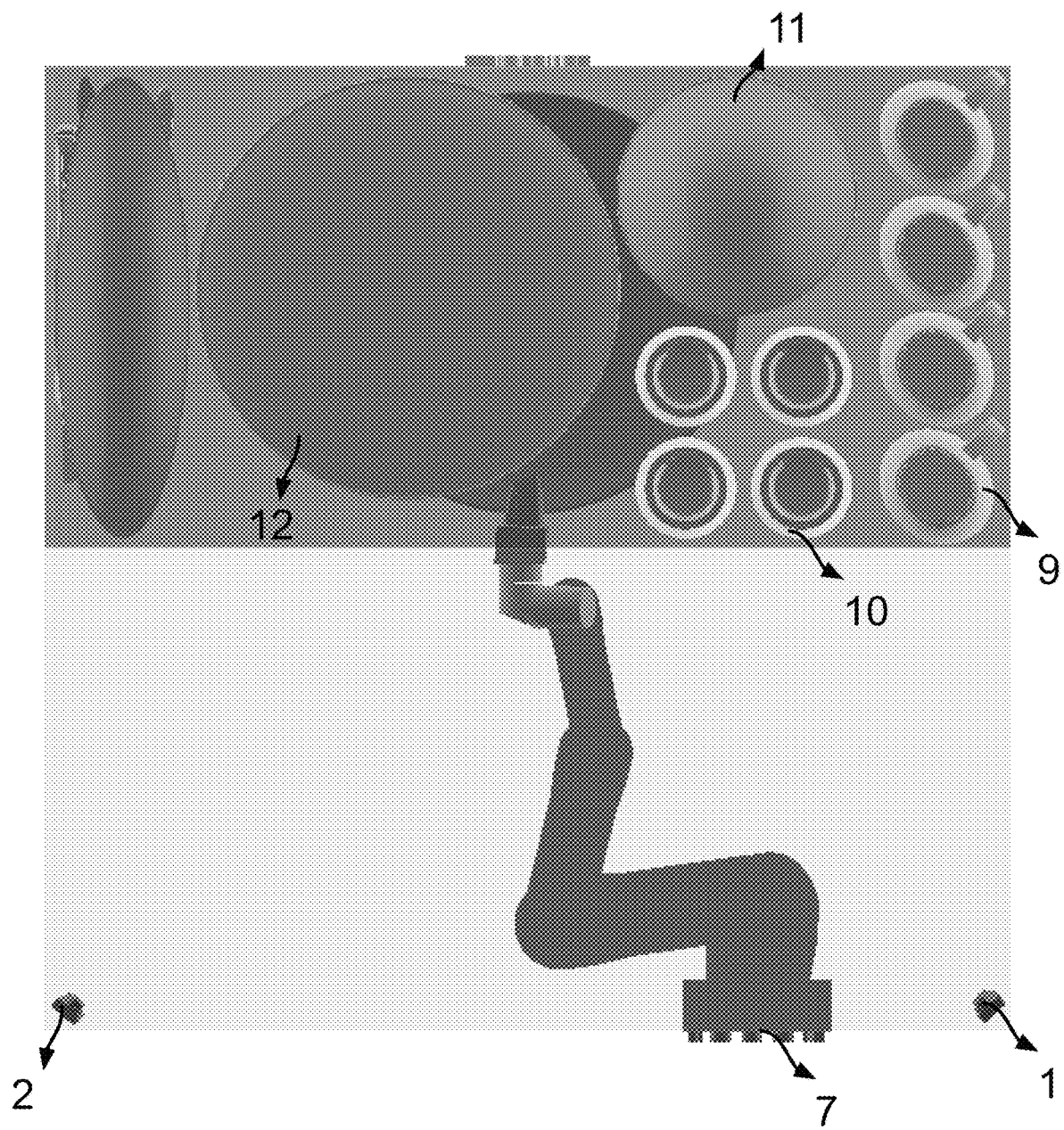
FIG. 10 shows a bottom view of a system for perceiving a dish, planning its handling, and controlling its motion, in accordance with the invention.

FIG. 10 shows a bottom view of a system for perceiving a dish, planning its handling, and controlling its motion, in accordance with the invention.

Figure 11:
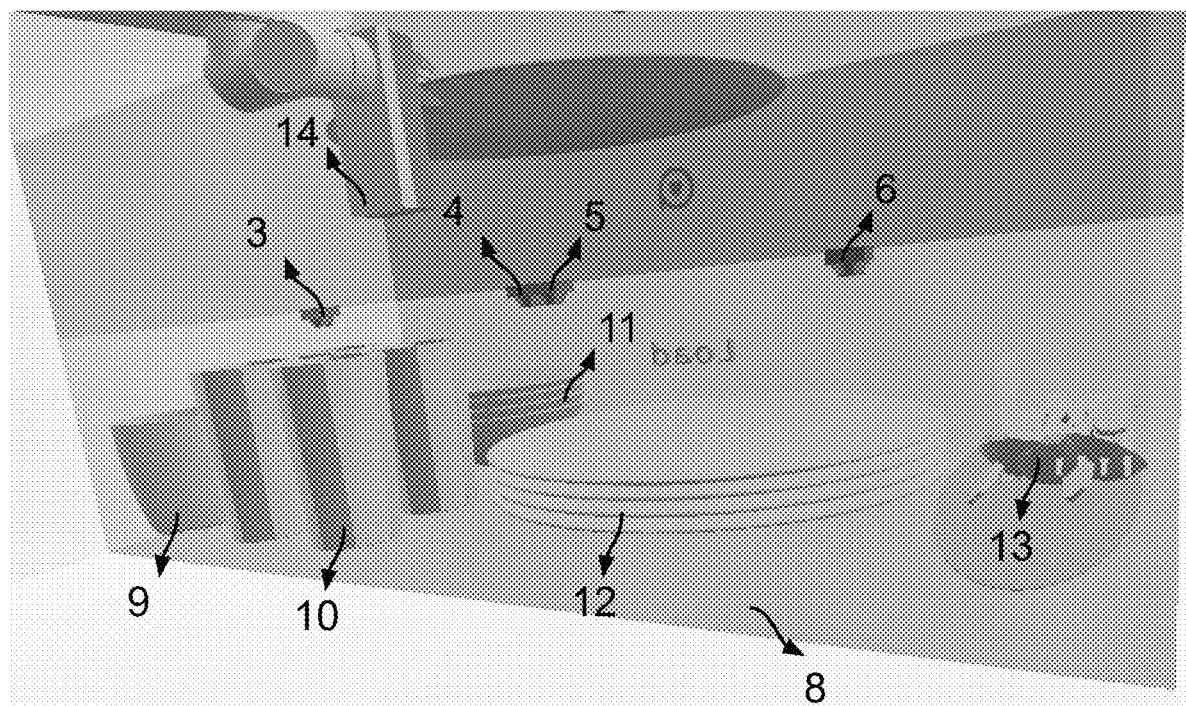
FIG. 11 shows a view from a camera mounted outside a cabinet disposed to comprise dishes, in accordance with the invention.

FIG. 11 shows a view from a camera 1 mounted outside a cabinet disposed to comprise dishes, in accordance with the invention.

Figure 12:
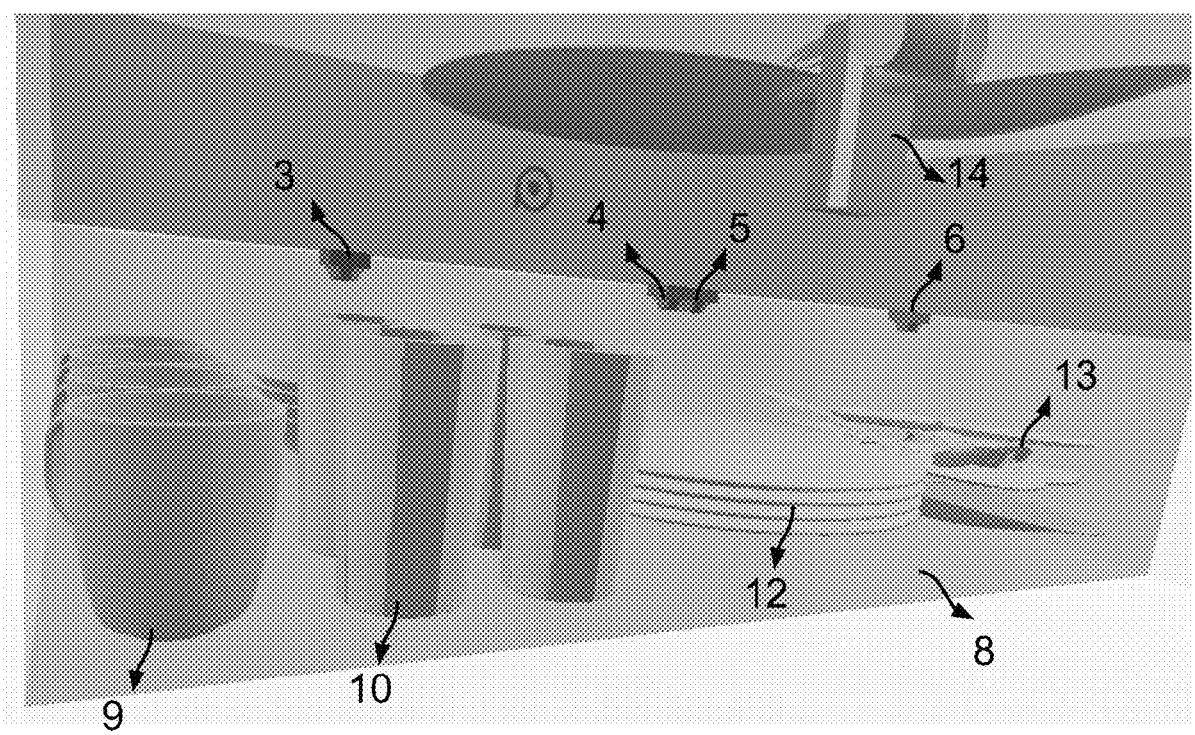
FIG. 12 shows a view from another camera mounted outside a cabinet disposed to comprise dishes, in accordance with the invention.

FIG. 12 shows a view from another camera 2 mounted outside a cabinet disposed to comprise dishes, in accordance with the invention.

Figure 13:
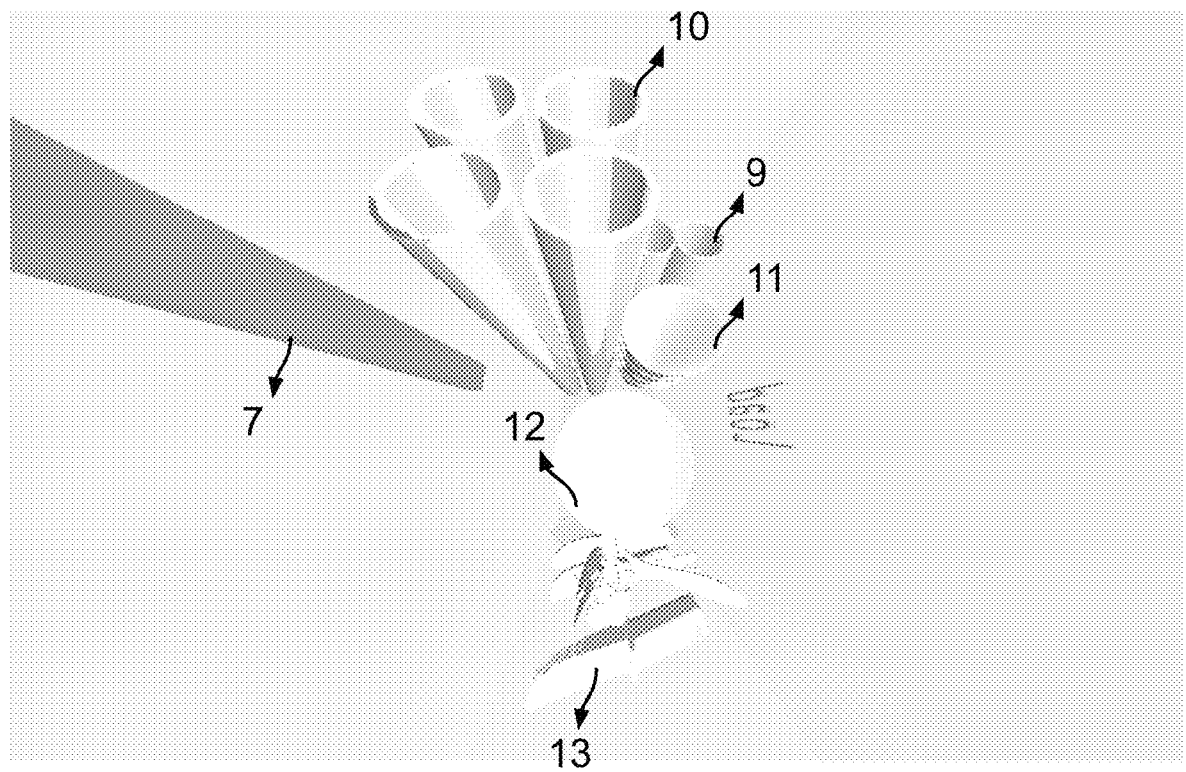
FIG. 13 shows a view from a camera mounted inside a cabinet disposed to comprise dishes, in accordance with the invention.

FIG. 13 shows a view from a camera 5 mounted inside a cabinet disposed to comprise dishes, in accordance with the invention.

Figure 14:
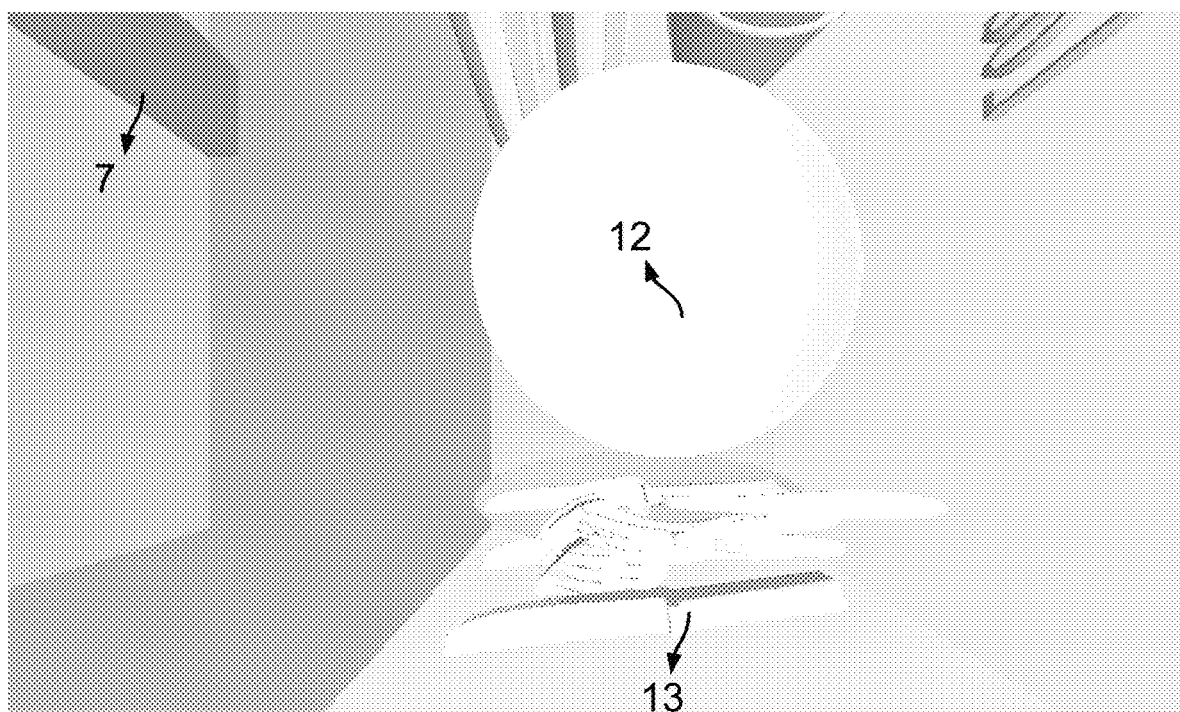
FIG. 14 shows a view from another camera mounted inside a cabinet disposed to comprise dishes, in accordance with the invention.

FIG. 14 shows a view from another camera 3 mounted inside a cabinet disposed to comprise dishes, in accordance with the invention.

Figure 15:
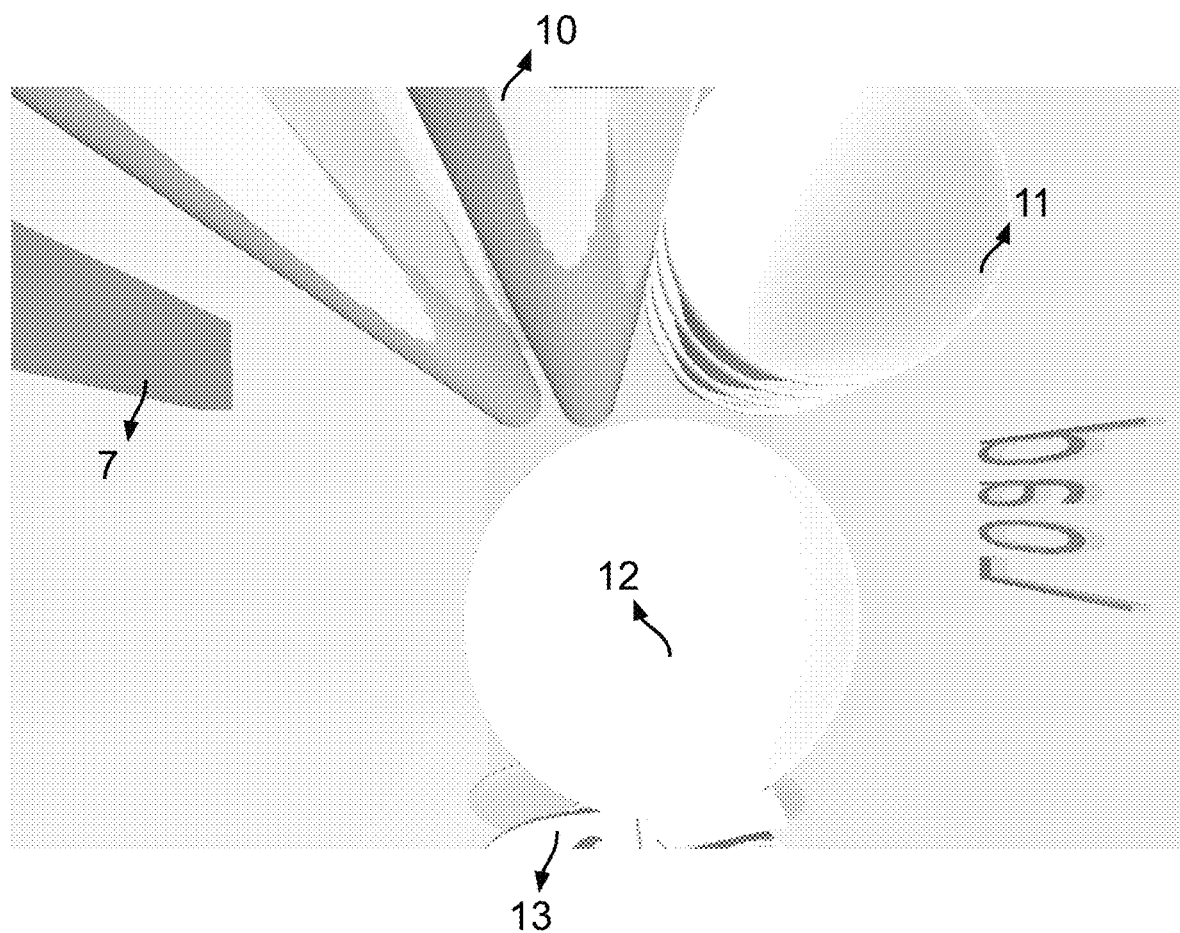
FIG. 15 shows a view from yet another camera mounted inside a cabinet disposed to comprise dishes, in accordance with the invention.

FIG. 15 shows a view from yet another camera 4 mounted inside a cabinet disposed to comprise dishes, in accordance with the invention.

Figure 16:
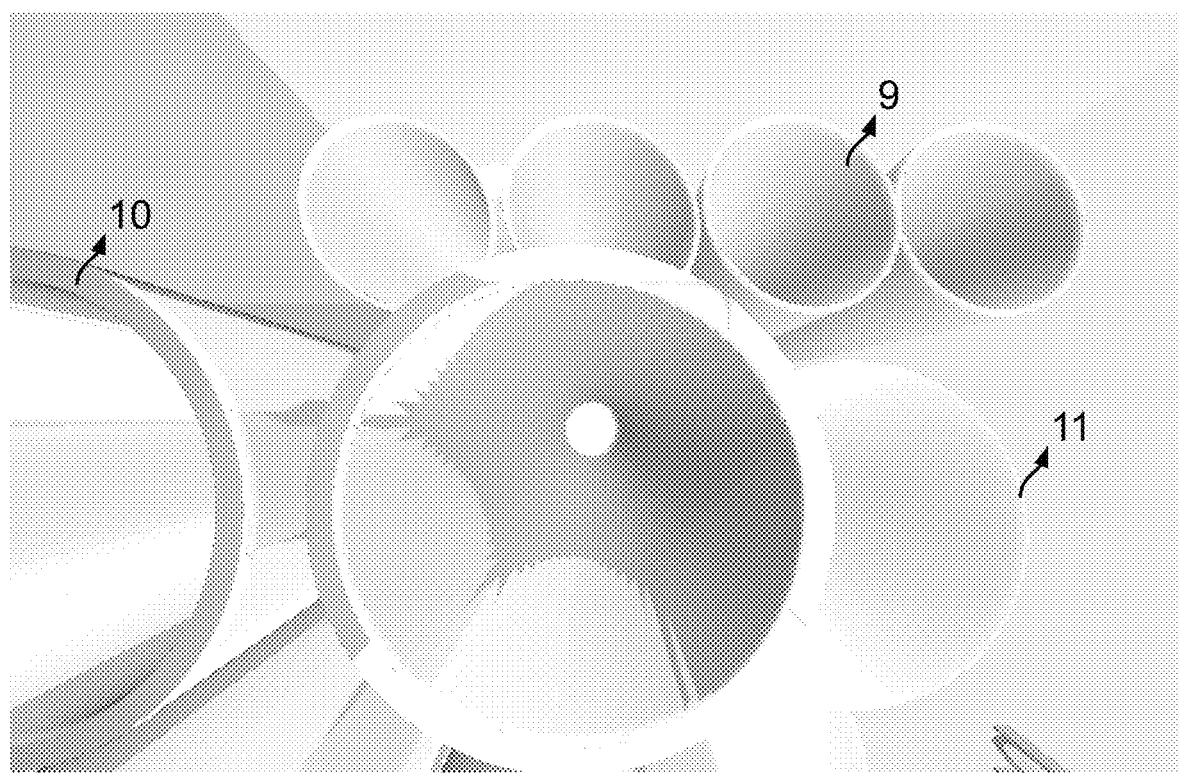
FIG. 16 shows a view from one more camera mounted inside a cabinet disposed to comprise dishes, in accordance with the invention.

FIG. 16 shows a view from one more camera 6 mounted inside a cabinet disposed to comprise dishes, in accordance with the invention.

Figure 17:
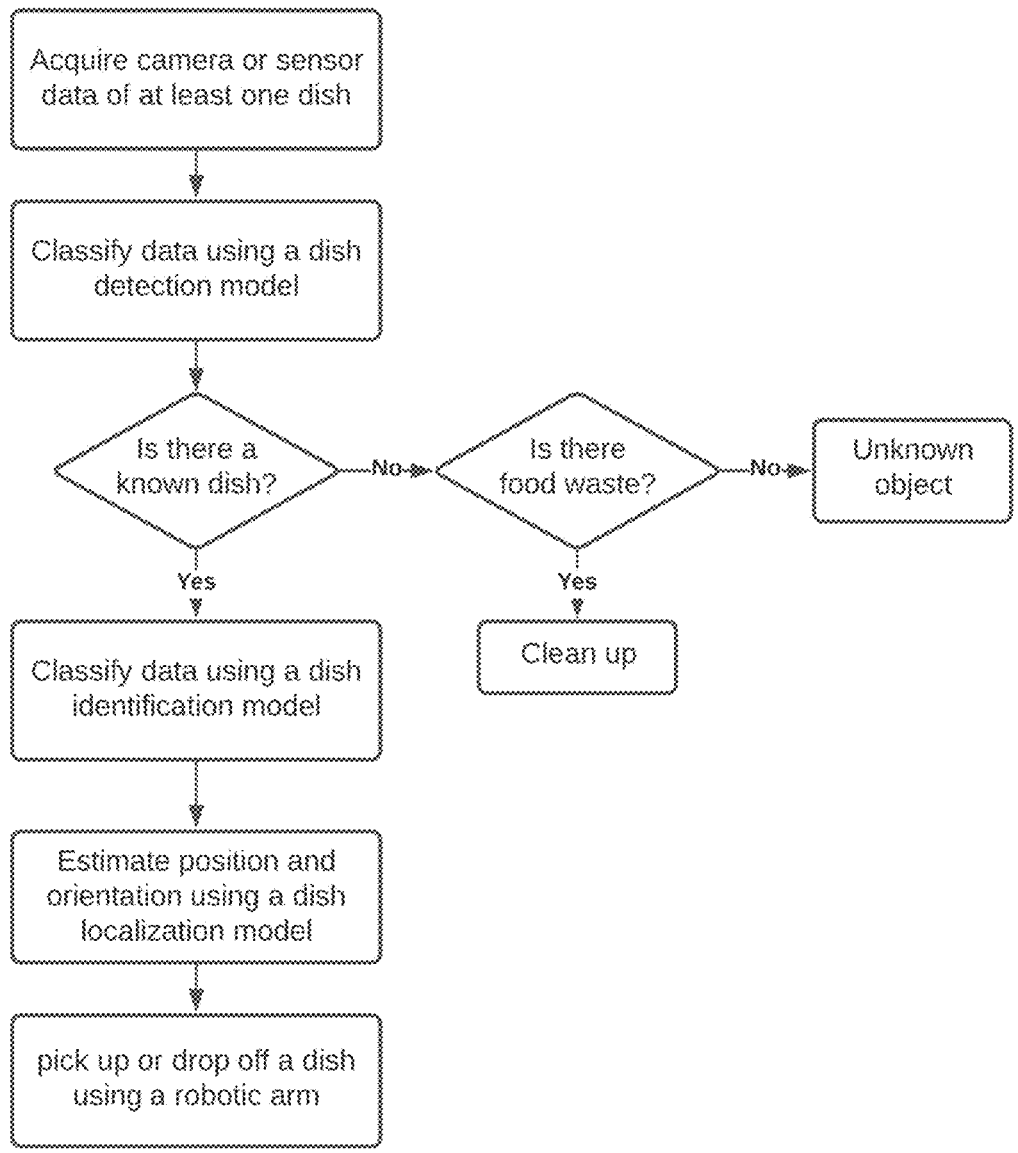
FIG. 17 shows a method to perceive dishes, in accordance with the invention.

FIG. 17 shows a method to perceive dishes, in accordance with the invention. The method comprises a series of steps. The first step involves capturing an image of a region disposed to comprise one or more dishes using at least one camera. The first step involves classifying an image using a dish detection model to determine the presence of a dish. The third step involves classifying an image using a dish identification model to determine the type of a dish. The fourth step involves estimating the position and orientation of a dish using a dish localization model. Finally, the fifth step involves picking up, holding, or dropping off a dish securely using the type, position, and orientation of said dish with a robotic arm. Accordingly, a dish is detected, identified, and localized to securely move it from one location to another. In some embodiments, the dish detection model classifies image data into one or more of the following classes: dish, food waste, unknown object, empty. In some embodiments, the dish identification model classifies image data into one or more of the following classes: plate, bowl, cup, mug, spoon, fork, knife, chopstick. In some embodiments, the dish localization model estimates the three dimensional positions of one or more points on said dish.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described above, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as a random access memory (RAM), a read only memory (ROM), a storage device such as a solid state drive (SSD) or a hard drive. Any such computer readable medium may reside on or within a single computational apparatus, and may be present on or within different computational apparatuses within a system or network.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A system for perceiving a dish, planning its handling, and controlling its motion, comprising:
   a. a cabinet holding said dish collocated with a plurality of other dishes;
   b. a diffuse light source for illuminating dishes and a structured light source for illuminating dishes with a structured pattern;
   c. a camera for capturing a diffuse image of said dishes when illuminated with said diffuse light source and a camera for capturing a structured image of said dishes when illuminated with said structured light source;
d. a robotic arm to pick up, hold, move or drop-off said dish;
e. a processor configured to:
 i. classify said diffuse image using a dish detection model to determine the presence of a dish;
 ii. classify said diffuse image using a dish identification model to determine the type of said dish;
 iii. capture said structured image when at least one dish is placed, removed or relocated;
 iv. estimate the position and orientation of said dish and the positions and orientations of dishes neighboring to said dish using a dish localization model with said diffuse image and said structured image;
 v. estimate a collision-free trajectory for said robotic arm using a planning model with said positions and orientations of said dish and its neighbors,
whereby said dish is detected, identified, and localized to securely move it from one location to another.

2. The system of claim 1, wherein said processor estimates the type, position, and orientation of all dishes in said cabinet.

3. The system of claim 1, wherein said dish is an article that makes contact with a food or a drink while preparing, serving, consuming, or storing of the food or the drink.

4. The system of claim 1, wherein at least one camera is mounted on the ceiling of said cabinet.

5. The system of claim 1, wherein at least one camera is mounted outside said cabinet such that said dish is visible in said image through a substantially transparent window or an opening of said cabinet.

6. The system of claim 1, wherein said robotic arm positions and orients an end effector based on said type, position, and orientation of said dish.

7. The system of claim 6, wherein said end effector comprises at least two movable fingers or a vacuum suction cup to grip said dish.

8. The system of claim 1, wherein at least one camera captures an image at a different wavelength than at least one other camera.

9. The system of claim 1, wherein said diffuse light source is either configured as a ring that surrounds a camera or configured as a diffuse illumination panel.

10. The system of claim 1, wherein said structured light source emits infrared light.

11. The system of claim 1, wherein said camera for capturing a structured image is designed to capture infrared images.

12. The system of claim 1, wherein said camera for capturing a diffuse image captures images at periodic intervals of time.

13. A method for perceiving a dish, planning its handling, and controlling its motion, comprising:
a. holding said dish with a plurality of other collocated dishes in a cabinet;
b. illuminating dishes with a diffuse light and illuminating dishes with a structured pattern;
c. capturing a diffuse image of said dishes when illuminated with said diffuse light and capturing a structured image of said dishes when illuminated with said structured pattern;
d. classifying said diffuse image using a dish detection model to determine the presence of a dish;
e. classifying said diffuse image using a dish identification model to determine the type of said dish;
f. capturing said structured image when at least one dish is placed, removed or relocated;
g. estimating the position and orientation of said dish and the positions and orientations of dishes neighboring to said dish using a dish localization model with said diffuse image and said structured image;
h. estimating a collision-free trajectory for a robotic arm using a planning model with said positions and orientations of said dish and its neighbors,
i. picking up, holding, or dropping off said dish with said robotic arm using said trajectory,
whereby said dish is detected, identified, and localized to securely move it from one location to another.

14. The method of claim 13, wherein said dish detection model classifies image data into one or more of the following classes: dish, food waste, unknown object, empty.

15. The method of claim 13, wherein said dish identification model classifies image data into one or more of the following classes: plate, bowl, cup, mug, spoon, fork, knife, chopstick.

16. The method of claim 13, wherein said dish localization model estimates the three dimensional positions of one or more points on said dish.

* * * * *